United States Patent [19]
Mead

[11] 3,857,736
[45] Dec. 31, 1974

[54] BATTERY CELL CONSTRUCTION WITH AN INDIUM ANODE AND INDIUM HYDROXIDE IN THE ELECTROLYTE
[75] Inventor: Ralph T. Mead, Kenmore, N.Y.
[73] Assignee: Wilson Greatbatch Ltd., Clarence, N.Y.
[22] Filed: Sept. 27, 1973
[21] Appl. No.: 401,187

Related U.S. Application Data
[63] Continuation of Ser. No. 235,544, March 17, 1972, abandoned.

[52] U.S. Cl. ............................ 136/100 R, 136/154
[51] Int. Cl. .......................................... H01m 17/00
[58] Field of Search ............. 136/100, 20, 154, 155, 136/120

Primary Examiner—Winston A. Douglas
Assistant Examiner—C. F. Lefevour
Attorney, Agent, or Firm—Olson, Trexler, Wolters, Bushnell & Fosse, Ltd.

[57] ABSTRACT

A battery cell construction is disclosed which has a cathode structure formed of a compound containing mercury oxide which may include silver. An anode is formed of an indium and tin alloy. The electrolyte solution used between the anode and cathode structures is a mixture of either potassium hydroxide with indium hydroxide or sodium hydroxide with indium hydroxide. The indium hydroxide is in an amount in excess of saturation. The battery cell includes a non-conductive insulating liner and cover which receives the anode and the quantity of electrolyte solution therein to provide a low resistance path between the anode and cathode and a high resistance path between the anode and the surrounding walls of a nickel housing.

19 Claims, 4 Drawing Figures

PATENTED DEC 31 1974 3,857,736
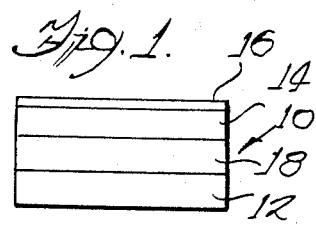
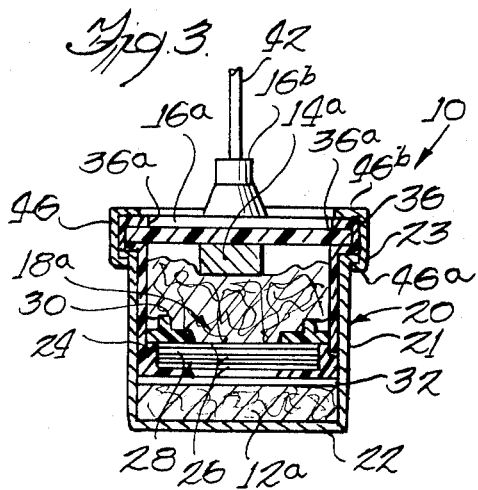
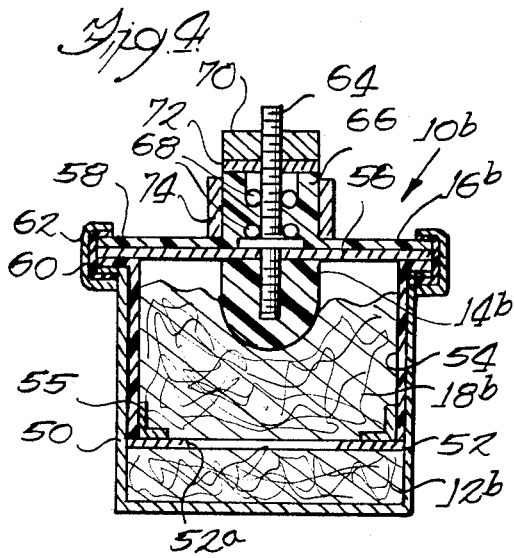
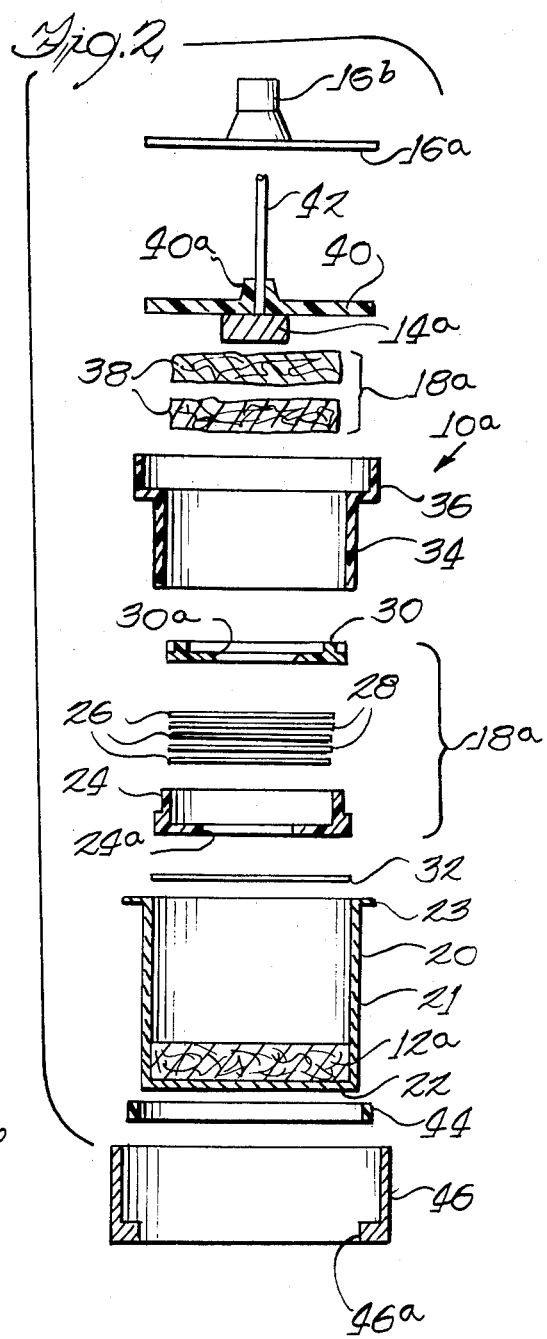

BATTERY CELL CONSTRUCTION WITH AN INDIUM ANODE AND INDIUM HYDROXIDE IN THE ELECTROLYTE

RELATED APPLICATION

This is a continuing application of Ser. No. 235,544 filed Mar. 17, 1972 now abandoned.

BACKGROUND OF THE INVENTION

This invention relates generally to a battery cell construction, and more particularly to a battery cell construction which can be used for implantation into the human body to operate an electronic device such as a heart stimulating pacemaker or the like.

Electronic devices for implantation into the human body are relatively well known. Such electronic devices may include pulsing circuits commonly referred to as heart pacemakers which electronically stimulate the heart at regular intervals or automatically provide a stimulating pulse upon sensing that the heart has not produced its own electromuscular pulse.

Electronic devices such as the pacemaker are dependent on battery power supplies to provide the necessary energization of the electronic circuitry therein and to provide the stimulating pulse to the heart. The power supplies used generally are small battery cells either singularly or a plurality of such battery cells are connected in parallel or series to increase the voltage or current delivered to the electronic device. Such battery cells must provide power for a relatively long period of time such as one year or more while the unit is implanted in a person's body. Many battery cells heretofore utilized for such purpose have encountered problems which have caused premature failure of the electronic device, a condition which is fatal to the person using it. For example, a catastrophic failure of the battery cell almost always produces a condition that kills the patient before a new pacemaker or battery cell can be put in its place. Even when replacing a battery cell of this general type, it must have a well defined life span and must be fresh, with minimum decay during shelf life, before it is used. Therefore, when replacing a battery cell or a pacemaker unit, the battery must be fully charged when installed so that it will provide a maximum life span, and have a predictable life expectancy, so that the person using the battery can know when to replace the unit.

SUMMARY OF THE INVENTION

Briefly, the battery cell construction of this invention utilizes a cathode formed of mercury oxide and may include silver. An anode formed of a tin-indium alloy, and the electrolyte used is a mixture containing indium hydroxide in an amount in excess of saturation, this mixture including either potassium hydroxide or sodium hydroxide. When indium is in contact with exposed nickel, it will generate hydrogen gas at a relatively low rate because of the saturated indium hydroxide in the electrolyte. The indium used in the battery cell has a sealable hydrogen gas equilibrium pressure when used with an alkaline electrolyte. However, this equilibrium pressure which can be sealed without damage to the battery is controlled to a minimum, with the battery cell of this invention. To minimize the self-discharge process caused by this gas generation it is desirable to keep the surface of the nickel housing covered and separated from the indium anode metal during discharge life. Also, to reduce the self-discharge or corrosion effects of the indium anode metal from occurring, the electrolyte solution has indium hydroxide in an amount in excess of saturation so that no further indium is attracted into the electrolyte solution. This, therefore, substantially reduces the corrosion effects of the anode cell. It also adds for increased shelf life as well as increased usable life. The anode construction disclosed herein involves coating the nickel contact plate with an indium-tin alloy and protecting the nickel surface at the exposed nickel-indium interface with a Teflon liner or other insulating material in such a manner as to provide a relatively low resistance path between the cathode and the indium anode and a relatively high resistance path between the indium anode and the nickel surface of the housing. The corrosion pattern of the indium-tin alloy is sufficiently uniform at low current densities to provide maximum protection from excessive exposure to the nickel surface. By providing a battery cell which has minimum contact of the indium anode with the exposed nickel and by providing indium hydroxide in an amount in excess of saturation, the hydrogen gas generated within the cell is at a relatively low rate. By providing an indium hydroxide solution at saturation, the equilibrium pressure of the hydrogen gas is substantially reduced and the battery cell is more readily sealed without fear of rupture during discharge of the battery. The battery cell constructed in this manner can have a relatively well defined battery life so that its replacement period can be precisely controlled.

Many objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a diagrammatic view showing the respective different layers of the battery cell construction of this invention;

FIG. 2 is an exploded sectional view showing the details of construction of the battery cell of this invention;

FIG. 3 is an assembled sectional view of the battery of FIG. 2; and

FIG. 4 illustrates an alternate form of battery construction utilizing the principles of this invention.

DETAILED DESCRIPTION OF THE ILLUSTRATED EMBODIMENT

Referring now to FIG. 1 is a simplified diagrammatic representation is shown of a battery cell constructed in accordance with the principles of this invention and is designated generally by reference numeral 10. The battery cell 10 has a cathode 12 formed of a mercury oxide composition, preferably including silver or silver powder therein in an amount of between 5% and 25%. Spaced from the cathode 12 is an anode 14 of indium-tin alloy in contact with a nickel anode electrode 16. An electrolyte layer 18 is positioned between the anode 14 and cathode 12 and preferably includes a mixture containing indium hydroxide in an amount in excess of saturation so as to be more compatible with the indium-tin alloy anode by substantially reducing the corrosion rate of the anode metal. Also, the advantage of reducing the gas generation pressure during discharge is obtained by having the indium hydroxide in an amount in excess of saturation. This enables the battery structure to be easily sealed against rupture. The electrolyte mixture also includes either potassium hydroxide or sodium hydroxide or a mixture of both.

Referring now to FIGS. 2 and 3, details of a battery construction are shown employing the principles of this invention. Here a housing 20, preferably of nickel, has a cylindrical body portion 21 and a flat bottom wall 22. The upper end of the cylindrical body 21 is turned radially outwardly to form a flange 23. The cathode material may be formed as a pasty mixture of mercury oxide which may include silver or silver powder. Preferably the mercury oxide may be in an amount of between 75% and 95% by weight whereas the silver, when used, may be in an amount of between 5% and 25% by weight. The cathode $12^a$, after being poured into the housing 20, is pressed to form a wafer or slug-like cathode element at the bottom of the housing 20.

The electrolyte layer $18^a$ is formed of a plurality of components which includes a receptacle 24 with a bottom wall thereof provided with an aperture $24^a$. Positioned within the receptacle 24 are alternate layers of fibrous material of two kinds. The layers 26 are formed of a membrane filter material such as polyvinylchloride acrylonitrile copolymer. One such material is identified by the trade name ACROPOR and supplied by Gelman Instrument Company, Ann Arbor, Michigan. The layers 28 are formed of thin polyethylene. The receptacle 24 then has a cover member 30 to hold the layers 26 and 28 in place. The cover member 30 has an aperture $30^a$ formed therein so that electrolyte solution can easily pass into the receptacle and into the layers 26 and 28.

Before the receptacle 24 is positioned in the housing 20, a nylon layer 32, or other fibrous material, is positioned over the cathode layer $12^a$. The receptacle 24 together with the layers 26 and 28 and the cover 30 are assembled and inserted into a liner 34 and forms the bottom thereof. The liner 34 is positioned in the container 20 and is firmly held therein by a press fit. The electrolyte layer $18^a$ also includes a pair of fibrous discs or wads 38 that absorb electrolyte solution and positioned within the liner and in contact with the cover 30 of the receptacle 24. The anode structure $14^a$ is positioned within the liner 34 and is in contact with the fibrous discs 38 and electrolyte fluid then freely communicates between the cathode and anode through the fibrous discs 38. The anode $14^a$ is carried by an insulating plate 40 and the electrical connection is provided by a lead wire 42 passing through the insulator 40 and which is electrically and mechanically connected to the anode $14^a$. The end plate $16^a$, which forms the anode end, has a bell shaped portion $16^b$ into which the hub portion $40^a$ of the insulator 40 is positioned. The electrical lead 42 is secured in position in the bell shaped end $16^b$ by epoxy to provide a gas seal about the electrical lead.

A rubber ring 44 or other gasket material is positioned about the outer surface of the housing 20 and a locking ring 46 has inwardly turned enlarged portions $46^a$ which engage the flanges 23 of the housing 20. The upper portion of the locking ring 46 is turned inwardly, this being shown at $46^b$ of FIG. 3, so as to maintain the battery in an assembled condition.

The liner 34 with the apertured bottom wall thereof formed by the receptacle 24 and together with the upper insulating member 40 provide an insulated chamber for receiving of the electrolyte solution and the anode $14^a$ so that a low resistance path exists between the anode $14^a$ and the cathode $12^a$ and a high resistance path exists between the anode $14^a$ and the inner wall surfaces of the nickel housing 20. Therefore, a minimum corrosion of the inner surface of the nickel housing will occur during the usable life of the battery.

Referring now to FIG. 4 there is seen an alternate form of a battery cell constructed in accordance with the principles of this invention and is designated generally by reference numeral $10^b$. Here a housing 50 is formed of nickel, or other similar material, and the cathode compound is deposited in the bottom of the housing and designated by reference numeral $12^b$. Over the cathode layer is positioned a layer 52 which has an aperture $52^a$ formed therein. A liner 54 is positioned in the housing 50 and is sealed in tight engagement with the inner wall of the housing by a ring 55 positioned within the liner to apply an outward force. The electrolyte material is designated by reference numeral $18^b$ and can be formed of any suitable electrolyte solution absorbing material such as the fibrous pads 38 of FIG. 2. The anode $14^b$ depends from an insulating cover 56 which, in turn, is adjacent a metal top cover 58. The anode $14^b$ is in contact with the electrolyte material $18^b$ to provide a current path between the anode and the cathode through the aperture $52^b$. The liner 54 together with the layer 52 and top cover 56 provide substantially a complete encasement of the anode and electrolyte material so that corrosion of the nickel housing is reduced.

The battery $10^b$ is held together by means of an insulating ring 60 and a rolled over metal ring 62 about the upper periphery thereof. The anode structure $14^b$ threadedly engages a shaft 64 which, in turn, passes through an insulating ring 66. A pair of miniature O-rings 68 embrace the shaft 64 on opposite sides of a radially inwardly turned portion of the insulating ring 66. A nut 70 and lock washer 72 are positioned on the threaded shaft 64 to bear downwardly on the insulating ring 66 and urge it outwardly against a retainer ring 74. The retainer ring 74 prevents outward cold flow of the material forming insulating ring 66 and thereby maintains its shape under compression.

In the illustrated embodiments of this invention the electrolyte and anode structures are positioned within insulating chambers or sleeves within the housing so that a minimum resistance path is formed between the anode and cathode and a maximum resistance current path is formed between the anode and its adjacent housing structure. While only these two specific embodiments are illustrated herein, it will be understood that variations and modifications of this invention may be effected without departing from the spirit and scope of the novel concepts disclosed and claimed herein.

The invention is claimed as follows:

1. A battery cell comprising in combination, cathode means formed of a compound containing mercury oxide, anode means formed of indium alloy, and electrolyte means between said cathode means and said anode means, said electrolyte means being formed of a mixture including indium hydroxide in an amount in excess of saturation to generate hydrogen gas at a relatively low rate.

2. The battery cell of claim 1 wherein said electrolyte means also includes potassium hydroxide.

3. The battery cell of claim 1 wherein said electrolyte means also includes sodium hydroxide.

4. The battery cell of claim 1 wherein said indium alloy is an alloy of indium and tin.

5. The battery cell of claim 4 wherein said indium is in an amount of between 20% and 80% and said tin is in an amount of between 80% and 20%.

6. The battery cell of claim 1 wherein said cathode means is formed of a compound containing a mixture of mercury oxide in an amount of between 75% and 95% and silver in an amount of between 25% and 5%.

7. The battery cell of claim 1 wherein said anode means includes a nickel anode electrode in contact with said indium alloy whereby said indium alloy absorbs generated hydrogen gas which comes in contact with said nickel electrode when the gas pressure reaches equilibrium pressure of said indium alloy, whereby further gas generation is stopped.

8. The battery cell of claim 1 wherein the quantity of said electrolyte means is limited so that during operation of the battery cell said electrolyte means will deplete before either said cathode means or said anode means, thereby eliminating voltage reversal at the end of cell life.

9. The battery cell of claim 1 wherein said anode means and said electrolyte means are positioned within a non-metal liner within said battery cell.

10. A battery cell construction comprising in combination, a metal housing having a cup shape to define a flat bottom wall with a circular side wall and an open end opposite said bottom wall, cathode means positioned within said housing and in contact with said bottom wall, said cathode means being formed of a compound containing mercury oxide, electrolyte means positioned within said housing over said cathode means, said electrolyte means containing indium hydroxide in an amount in excess of saturation to generate hydrogen gas at a relatively low rate, insulating cover means positioned over said open end of said housing, said insulating cover means being secured to the upper end of said housing about the periphery thereof, and anode electrode means depending from said insulating cover means and extending into said housing to be in contact with said electrolyte means, said anode electrode being formed of an indium alloy.

11. The battery cell construction of claim 10 wherein said metal housing is formed of nickel.

12. The battery cell construction of claim 10 wherein said cathode means is formed of a composition of mercury oxide and silver.

13. The battery cell construction of claim 12 wherein said mercury oxide is in an amount of between 70% and 95% and said silver is in an amount of between 30% and 5%.

14. The battery cell construction of claim 10 further including separator means formed of non-conductive material positioned within said housing and over said cathode means, said separator means maintaining said electrolyte from contact with the inner surface of said housing, and wherein said indium alloy cathode depends from said cover and is positioned inwardly of said separator means to be in contact with said electrolyte.

15. The battery cell construction of claim 10 wherein said indium alloy anode is formed of an indium-tin composition.

16. The battery cell construction of claim 15 wherein said indium is in an amount of between 20% and 80% and wherein said tin is in an amount of between 80% and 20%.

17. The battery cell construction of claim 10 further including nickel electrode means in contact with said indium alloy anode to provide an anode electrode for the battery cell.

18. The battery cell construction of claim 10 wherein the quantity of said electrolyte means is limited so that during operation of the battery cell said electrolyte will deplete before either said cathode means or said anode means, thereby eliminating voltage reversal at the end of cell life.

19. The battery cell construction of claim 10 wherein said anode electrode means and said electrolyte means are positioned within a liner of insulating material which extends from said cathode means to said insulating cover.

* * * * *